United States Patent
Hirai et al.

(10) Patent No.: US 6,444,596 B1
(45) Date of Patent: *Sep. 3, 2002

(54) AIR BAG AND BASE CLOTH THEREFOR

(75) Inventors: Kinji Hirai, Tokyo; Masahiko Minemura, Usui-gun; Yoshitaka Koshiro, Tokyo; Susumu Nakamura, Tokyo; Kazuyuki Hanada, Tokyo, all of (JP)

(73) Assignees: Takata Corporation, Tokyo (JP); Shin-Etsu Chemical Co., Ltd., Usui-gun (JP); Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/480,888

(22) Filed: Jan. 11, 2000

(30) Foreign Application Priority Data

Jan. 12, 1999 (JP) ............................................. 11-005501

(51) Int. Cl.$^7$ ............................................... B32B 27/12
(52) U.S. Cl. ..................... 442/286; 428/34.3; 428/34.5; 428/34.7; 428/36.1; 428/66; 428/76; 280/728.1; 442/168; 442/170; 442/171; 442/172; 442/287; 442/288; 442/289; 442/290; 442/293; 442/294
(58) Field of Search ....................... 280/728.1; 428/34.3, 428/34.5, 35.7, 36.1, 66, 76; 442/168, 170, 171, 172, 286, 287, 288, 289, 290, 293, 294

(56) References Cited

U.S. PATENT DOCUMENTS

| 5,524,926 A | * | 6/1996 | Hirai et al. | .............. | 280/743.1 |
| 5,944,345 A | * | 8/1999 | Hirai et al. | .............. | 280/743.1 |
| 5,945,185 A | * | 8/1999 | Hirai et al. | ................ | 428/35.2 |

FOREIGN PATENT DOCUMENTS

| JP | 11-34179 | * | 7/1997 | ........... | B29D/22/00 |

* cited by examiner

Primary Examiner—Terrel Morris
Assistant Examiner—Arti R. Singh
(74) Attorney, Agent, or Firm—Kanesaka & Takeuchi

(57) ABSTRACT

A base cloth for an air bag is obtained by forming a film of a silicone modified thermoplastic polyurethane resin having a polysiloxane segment on a surface of a woven fabric, and the air bag is formed of the base cloth. Since an organic solvent is not used when the resin is prepared, its workability is superior, the resin is safe for the human body. Also, the air bag can be quickly developed in a wide range from an extremely low temperature to a high temperature, and there is no problem of adhesion or sticking. Thus, the air bag having a stable performance and the base cloth for the air bag are provided.

5 Claims, No Drawings

AIR BAG AND BASE CLOTH THEREFOR

BACKGROUND OF THE INVENTION AND RELATED ARE STATEMENT

The present invention relates to an air bag and a base cloth therefor for an air bag device installed in a car or vehicle for protecting a driver or passenger at a time of collision of the car, more particularly, a high performance air bag formed of a base cloth obtained by forming a coating film of a silicone modified thermoplastic polyurethane resin on a surface of a woven fabric of fibers, such as polyamide and polyester, and the base cloth for the air bag.

An air bag device for a driver installed at a center of a steering wheel includes a retainer, an air bag attached to the retainer, a gas generator or inflator for developing the air bag, and a module cover for covering the air bag. When a car collides, gas is generated from the inflator, and the air bag develops in a compartment while bursting the module cover.

on the other hand, in an air bag device for a passenger's seat provided at an instrument panel, an air bag and an inflator are attached to a container, and a module cover is further attached to the container to cover an opening thereof. The module cover is called a lid or deployment door. When a car collides, the inflator is actuated to develop the air bag. The module cover pushed by the developing air bag is opened to the side of the vehicle compartment to thereby largely develop the air bag into the vehicle compartment.

Heretofore, as an air bag, the following have been proposed.

1. An air bag formed of a base cloth obtained by coating silicone rubber disclosed in Japanese Patent Publications (KOKAI) No. 63-78744 and (KOKAI) No. 2-270654 and chloroprene rubber on a woven fabric of a synthetic resin, such as polyester and polyamide.

2. An air bag formed of a base cloth obtained by coating a silicone emulsion composition and a silicone latex composition, as a composition not using an organic solvent in view of a working environment, on a woven fabric as disclosed in Japanese Patent Publications (KOKAI) No. 56-16553, (KOKAI) No. 54-131661, (KOKAI) No. 5-98579 and U.S. Pat. No. 3,817,894.

3. An air bag made of a thermoplastic elastomer, such as thermoplastic polyurethane as disclosed in Japanese Patent Publication (KOKAI) No. 4-266544.

Among the prior air bags, the air bag (1) as described above is obtained such that a hardener, adhesive assistant and reinforcer are added to chloroprene rubber and silicone rubber to obtain a composition; the composition is diluted by an organic solvent; and the diluted composition is coated on a base cloth of nylon or the like. Here, the reason why the organic solvent is required is as follows.

Namely, the base cloth of the air bag folded into a small size is developed by blasting to thereby inflate the air bag. When the air bag is developed, since a film coated on the air bag base cloth is also instantaneously expanded following the development of the air bag base cloth, the coating film itself is also required to have a sufficiently high mechanical strength. Thus, relatively high molecular weight base polymer is used for the chloroprene coating material and silicone coating material used at present so that the hardened film thereof has sufficient strength and expanding ability. However, the high molecular weight base polymer can not be applied by a knife coater, offset coater, gravure coater or the like to obtain a thickness (40 to 100 $\mu$m) of the coating film required for the ordinary air bag. Therefore, the coating material using the high molecular base polymer is normally diluted by the organic solvent to a viscosity with which it is easily coated.

However, in the air bag (1) wherein the organic solvent is used as explained above, when the coating is carried out, there is a dangerous situation such that the organic solvent catches fire due to static electricity under the working environment, or there is a problem for a worker to breath the organic solvent or contact the organic solvent in his skin to thereby injure his health. Also, in a viewpoint of prevention of an environmental pollution, such as air pollution, the used solvent is bound to be recovered. However, it requires a great amount of money to recover the used solvent. Thus, it has been expected that the organic solvent is not used in various fields as well as in the air bag industry.

As the simplest method for not using or expelling the organic solvent in the coating material, it is considered that the viscosity of the base polymer of the coating material is lowered to a degree with which coating can be easily carried out by the knife coater or the like. In other words, a polymerization degree of the base polymer is considered to be lowered. However, when the polymerization degree of the base polymer is small, the formed coating film has insufficient mechanical strength, and when the air bag is developed, cracks are formed in the coating film, so that there is a risk of explosion or blast of a gas with a high temperature. Also, when the viscosity is lowered too much, the coating material passes or strikes through meshes of a plain weave of nylon fibers and the like as the base cloth for an air bag, and in winding up the coated cloth with the coating material striking through the meshes the coated cloth is blocked; or in carrying out the operation, the coating material striking or passing through the meshes adheres to rolls of a coating machine to thereby deteriorate the workability of the machine, or damage an appearance of the obtained product.

In the air bag (2) using no organic solvent but using the silicone emulsion composition as the coating material, it takes a long time to form the coating film, so that it is not favorable as the air bag in a viewpoint of productivity and cost.

The air bag (3) formed of the thermoplastic elastomer as explained above has an advantage such that since the base cloth can be subjected to thermal fusion bonding, a sewing process can be omitted relative to the base cloth formed by coating rubber onto the synthetic fiber fabric. However, hardness of the thermoplastic elastomer is extremely changeable according to variation of temperature. Thus, when the air bag is developed, there is a risk such that the air bag is enlarged too much or torn in case of a high temperature, and, on the contrary, it is insufficiently developed in case of a low temperature.

The present invention has been made in view of the above problems in the conventional air bags, and an object of the invention is to provide an air bag and air bag base cloth, wherein an organic solvent is not used at a time of production, so that workability is good and the working environment is safe for the human body.

Another object of the invention is to provide an air bag and air bag base cloth as stated above, wherein the air bag can be quickly developed in a wide range from an extremely low temperature to a high temperature.

A further object of the invention is to provide an air bag and air bag base cloth as stated above, wherein the air bag and air bag base cloth can provide stable performance without any adhesion problems.

Further objects and advantages of the invention will be apparent from the following description of the invention.

SUMMARY OF THE INVENTION

An air bag of the present invention is formed of a base cloth obtained by forming a coating film of a silicone modified thermoplastic polyurethane resin having a polysiloxane segment on a surface of a woven fabric.

The base cloth for the air bag of the present invention is obtained by forming the coating film of the silicone modified thermoplastic polyurethane resin having the polysiloxane segment on the surface of the woven fabric.

In case the silicone modified thermoplastic polyurethane resin having the polysiloxane segment is used, the coating film can be formed on the surface of the woven fabric by a co-extruding, thermal fusion bonding, bonding or the like, without using an organic solvent. Moreover, the coating film formed on the woven fabric exhibits a stable performance in a wide range from an extremely low temperature to a high temperature.

In the present invention, it is preferable that a siloxane component contained in the silicone modified thermoplastic urethane resin is 5 to 40% by weight with respect to the resin.

The silicone modified thermoplastic polyurethane resin can be obtained by allowing polyol, polyisocyanate, polysiloxane and, if necessary, a chain extension agent to react. It is preferable that the polysiloxane is active hydrogen containing polysiloxane represented by the following general formula (1):

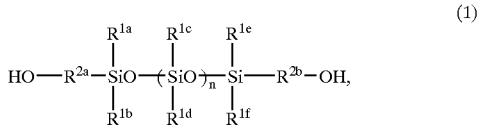

wherein, $R^{1a}$–$R^{1f}$ represent an alkyl group or aryl group of the same or different kinds having a carbon number of 1–8; $R^{2a}$ and $R^{2b}$ represent an alkylene group or di-substituted group having an ester bond or ether bond, of the same or different kinds; and n represents an integer of 5 to 200.

In a silicone modified thermoplastic polyurethane resin according to the present invention, in case a siloxane component in the resin is less than 5% by weight (hereinafter simply referred to as "wt %"), since a blocking resistance of a folded air bag is poor, development of the air bag can not be smoothly performed, and, in an extreme case, crack may be formed therein together with a woven fabric. On the other hand, in case the siloxane component in the resin is over 40 wt %, the resin has a low strength and its melt viscosity becomes high so that formation becomes difficult. Further, there is a problem such that the resin is poor in adhesion with the woven fabric. Therefore, the content of the polysiloxane component in the silicone modified thermoplastic polyurethane resin is preferably 5 to 40 wt %, more preferably 10 to 30 wt %.

Incidentally, the polysiloxane component in the silicone modified thermoplastic polyurethane resin according to the present invention is represented by the following general formula (2):

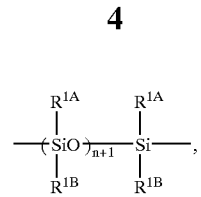

wherein $R^{1A}$ and $R^{1B}$ represent an alkyl group or aryl group of the same or different kinds having a carbon number of 1–8; and n represents an integer of 5–200.

In the present invention, a preferable polysiloxane in the silicone modified thermoplastic polyurethane resin is active hydrogen containing polysiloxane, such as an amino group containing polysiloxane, hydroxyl group containing polysiloxane and carboxyl group containing polysiloxane. More preferably, silicone diol having two hydroxyl groups at ends of the general formula (1) described above can be mentioned.

Incidentally, in the above-mentioned general formula (1), as the alkyl group of $R^{1a}$–$R^{1f}$, a methyl group, ethyl group and octyl group are preferable, and as the aryl group, a phenyl group is preferable.

Also, as $R^{2a}$ and $R^{2b}$, an ethylene group, trimethylene group, 2-oxapentamethylene group and 3-oxahexamethylene group are preferable.

Also, it is preferable that n is an integer of 5 to 200, and an average molecular weight is 500 to 20,000.

As a synthesizing method of silicone diol as mentioned above, there can be mentioned methods for, in the presence of polyhydrogen siloxane and a platinum catalyst, subjecting allylglycol or like to reaction; subjecting an alcoholic hydroxyl group containing siloxane and a cyclic ester, such as caprolactone and butyrolactone, to a ring-opening polymerization; and subjecting carboxylic acid modified siloxane and diol to a dehydration condensation. Especially, in the present invention, silicone diol comprising a copolymer of a hydroxyl group containing siloxane and caprolactone is preferable.

The silicone modified thermoplastic polyurethane resin according to the present invention can be obtained by subjecting polysiloxane, such as silicone diol, polyol, polyisocyanate and, if necessary, with a chain extension agent to a reaction.

Here, while known high molecular polyols can be used as the polyols except for silicone diol, there can be mentioned polyols having, preferably, an average molecular weight of 500 to 10,000, for example, polyester type polyols, polyether type polyols, polycarbonate type polyols, and polylactone type polyols, such as polyethylene adipate, polyethyleneplopylene adipate, polyethylenebuthylene adipate, polybutylene adipate, polyhexamethylene adipate, polydiethylene adipate, polyethylene succinate, polybutylene succinate, polyethylene sebacate, polybutylene sebacate, polypropylene glycol, polytetramethylene ether glycol, poly-ε-caprolactone diol and polyhexamethylene carbonate, and polyols containing a suitable quantity of polyoxyethylene chains in the above-mentioned polyols.

While a quantity to be used of high molecular weight polyol as described above is not especially limited, it is preferable that high molecular weight polyol is used at a ratio of 5 to 40 wt % to the whole polyol quantity, which includes diol as polysiloxane and low molecular diol as the chain extension agent, in a raw material.

As the chain extension agent, while known materials, such as low molecular diol and low molecular diamine, can be used, low molecular diol having an average molecular weight of 250 or less is preferable. Specifically, ethylene glycol, plopylene glycol, diethylene glycol, 1,4-butane diol, 1,6-hexane diol, bishydroxyethylether benzene and the like can be mentioned.

Although a quantity used for low molecular diol is not specially limited, low molecular diol can be preferably used in a range of 5 to 30 wt % to the whole polyol.

As polyisocyanates, known materials can be used. For example, there are mentioned 4,4'-diphenylmethane diisocyanate (MDI), water added MDI, isophorone diisocyanate, 1,3-xylene diisocyanate, 1,4-xylene diisocyanate, 2,4-tolylene diisocyanate, 2,6-tolylene diisocyanate, 1,5-naphthalene diisocyanate, m-phenylene diisocyanate and p-phenylene diisocyanate, or urethane prepolymers obtained by allowing organopolyisocyanates of the above-mentioned materials to react on low molecular weight polyol and polyamine to be end isocyanates.

In case the silicone modified thermoplastic polyurethane resin is synthesized, a ratio of the whole polyol including diol to polyisocyanate in the raw material is preferably 0.90 to 1.15 in terms of an equivalent weight ratio of NCO/OH.

The silicone modified thermoplastic polyurethane resin according to the invention can be synthesized by known methods. For example, after a part of a polyol component and a part or all of an isocyanate component are subjected to react to synthesize a prepolymer, the remaining polyol component is reacted with the prepolymer; a polyisocyanate component is reacted to a polyol component and a chain extension agent with an equivalent amount; and the like.

Although representative physical properties of the silicone modified thermoplastic polyurethane resin according to the present invention are shown hereunder, the present invention is not especially limited thereby.

flow starting point: 195–220° C.
melt viscosity: $0.1 \times 10^4 – 20 \times 10^4$ poise at 220° C.
hardness : 83–97

Incidentally, the flow starting point and melt viscosity were measured according to the Japanese Industrial Standard (hereinafter referred to simply as "JIS") K7311 by a Kohka flow tester under the conditions of a nozzle of 1 mm (diameter)×10 mm (length); at a load of 50 kgf/cm$^2$; and at a temperature rising speed of 3° C./minute. Also, the hardness was measured according to JIS K7311.

The silicone modified thermoplastic polyurethane resin as described above may be used together with other resins. In this case, as the resins to be blended therewith, there are mentioned a polyester type elastomer, polyamide type elastomer, styrene type elastomer, such as SBS, SEBS and maleic acid modified SEBS; olefin type elastomer, such as EPR and EPDM; styrene type resin, such as PS, HIPS, AS, ABS and AES; chlorine type resin, such as PVC and chlorinated polyethylene; olefin type resin, such as PE, PP and EVA; ester type resin; amide type resin; and the like.

Also, there may be added known additives, such as a flame retardant, pigment, extender pigment, colorant, inorganic filler, organic filler, stabilizer, hydrolysis preventive, oxidation preventive, light proof stabilizer, ultraviolet absorbent, lubricant, plasticizer, antistatic agent, surface active agent, cross linking agent, foaming agent and defoaming agent.

In case the above-mentioned various additives are added, it is preferable that a quantity to be added thereto is less than 50 wt % relative to the resin.

A base cloth of the invention is obtained by forming a coating film of the silicone modified thermoplastic polyurethane resin on a surface of a woven fabric. As the woven fabric, there is mentioned a woven fabric comprising fibers of one or more selected from a group of nylon, vinylon, polyester, polyurethane and the like, preferably, a woven fabric comprising fibers of nylon and polyester. As a weave type of the woven fabric, a plain weave is preferable; a fineness of a filament yarn for constituting the woven fabric is 210 to 840 denier (hereinafter, referred to as "d"); number to be woven is preferably 32–76 pieces/inch.

In case the coating film of the silicone modified thermoplastic polyurethane resin is formed on the surface of the woven fabric as described above, there is used a co-extruding method wherein a molten silicone modified thermoplastic polyurethane resin is extruded on the woven fabric in a film form to be integrated; a fusion bonding method by heat or the like, such as a calendaring; or a method using a bonding agent.

It is preferable that the thickness of the coating film to be formed is 10 to 100 μm. In case the thickness is less than 10 μm, when the air bag is developed, the coating film tends to crack. On the other hand, when the thickness of the coating film is larger than 100 μm, it becomes difficult to fold and house the air bag and, at the same time, its developing ability at a low temperature becomes poor.

The present invention will be described specifically by providing Examples and Comparative Examples hereunder. Incidentally, in the following explanations, "part" and "%" are based on weight unless otherwise specified.

EXAMPLE 1

324 parts of 1,4-buthanediol and 1,160 parts of 4,4'-diphenylmethanediisocyanate are reacted, at a temperature of 100 ° C., with 1,000 parts of ester modified polysiloxanepolyol (SI) having an average molecular weight of 5,200 and a siloxane component of 60% obtained by copolymerizing alcohol modified siloxane oil having an average molecular weight of 3,200 (KF-6002; manufactured by Shinetsu chemical Co., Ltd.) and e-caprolactone, and 1,080 parts of polytetramethylene ether glycol having an average molecular weight of 1,700, to thereby obtain a silicone modified thermoplastic polyurethane resin (U1).

The siloxane component content and physical properties of the obtained silicone modified thermoplastic polyurethane resin (U1) are shown in Table 1.

A base cloth for an air bag was obtained by thermal fusion bonding of the silicone modified thermoplastic polyurethane resin (U1) to form a coating film of 100 μm on a plain weave fabric of nylon fineness of 420 d and 46 pieces/inch of warps and wefts through calendaring.

Characteristics of the air bag base cloth were evaluated according to the following methods, and the results are shown in Table 1.

Sheet Adhesiveness:

Resin fusion bonding sides of the base cloth sheets were arranged to face each other and left for 504 hours under the condition of a pressurized surface area of 50 mm x 50 mm with a load of 35 gf/cm$^2$ at a temperature of 100±2° C. Thereafter, the load was removed, the sheets were left for 30 minutes and then separated from each other to measure their adhesiveness. The results were evaluated according to the following standards.

x: sheets were entirely adhered to each other and could not be peeled off
Δ: sheets were partly peeled off
○: sheets were entirely peeled off Inflation Test:

The obtained base cloth for the air bag was processed to form an air bag, and the air bag was subjected to inflation tests at temperatures from −40° C. to 100° C. The results were evaluated by the following standards.

x: large crackings were formed at the time of development

Δ: small crackings were formed at the time of development

◯: no crackings were noticed at the time of development

EXAMPLE 2

181 parts of 1,4-buthanediol and 581 parts of 4,4'-diphenylmethanediisocyanate were reacted, at a temperature of 100° C., with 1,000 parts of ester modified polysiloxane polyol (S1) used in Example 1 and 100 parts of alcohol modified siloxane oil (KF-6002; produced by Shinetsu chemical Co., Ltd.) having an average molecular weight of 3,200, to obtain a sample of a silicone modified thermoplastic polyurethane resin (U2). A content of the siloxane component in the obtained silicone modified thermoplastic polyurethane resin (U2) and physical properties thereof are shown in Table 1.

Various characteristics with respect to the thus obtained silicone modified thermoplastic polyurethane resin (U2) were evaluated in the same manner as in Example 1, and the results are shown in Table 1.

EXAMPLE 3

725 parts of 1,4-buthanediol and 2,727 parts of 4,4'-diphenylmethanediisocyanate were reacted, at a temperature of 100° C., with 1,000 parts of ester modified polysiloxane polyol (S1) used in Example 1 and 3,800 parts of polytetramethylene ether glycol having an average molecular weight of 1,700, to obtain a silicone modified thermoplastic polyurethane resin (U3) having a content of the siloxane component and various physical properties as shown in Table 1. Various characteristics with respect to the thus obtained silicone modified thermoplastic polyurethane resin (U3) were evaluated in the same manner as in Example 1, and the results are shown in Table 1.

COMPARATIVE EXAMPLE 1

151 parts of 1,4-buthanediol and 589 parts of 4,4'-diphenylmethanediisocyanate were reacted, at a temperature of 100° C., with 1,000 parts of polytetramethylene ether glycol having an average molecular weight of 1,700, to obtain a thermoplastic polyurethane resin (U4) having various physical properties as shown in Table 1. Various characteristics with respect to the thus obtained thermoplastic polyurethane resin (U4) were evaluated in the same manner as in Example 1, and the results are shown in Table 1.

COMPARATIVE EXAMPLE 2

1,179 parts of 1,4-buthanediol and 4,495 parts of 4,4'-diphenylmethanediisocyanate were reacted, at a temperature of 100° C., with 1,000 parts of the ester modified polysiloxane polyol (S1) used in Example 1 and 6,800 parts of polytetramethylene ether glycol having an average molecular weight of 1,700, to obtain a silicone modified thermoplastic polyurethane resin (U5) having a content of siloxane component and various physical properties as shown in Table 1. Various characteristics with respect to the thus obtained thermoplastic polyurethane resin (U5) were evaluated in the same manner as in Example 1, and the results are shown in Table 1.

COMPARATIVE EXAMPLE 3

280 parts of 1,4-buthanediol and 914 parts of 4,4'-diphenylmethanediisocyanate were reacted, at a temperature of 100° C., with 1,000 parts of ester modified polysiloxane polyol (S1) used in Example 1 and 700 parts of alcohol modified siloxane oil (KF-6002; produced by Shinetsu chemical Co., Ltd.) having an average molecular weight of 3,200, to obtain a silicone modified thermoplastic polyurethane resin (U6) having the content of siloxane and various physical properties as shown in Table 1. Various characteristics with respect to the thus obtained silicone modified thermoplastic polyurethane resin (U6) were evaluated in the same manner as in Example 1, and the results are shown in Table 1.

TABLE 1

| Examples | Resin | Content of siloxane component (wt %) | Flow starting point (° C.) | Melt viscosity (poise/220° C.) | Hardness (JIS A) | Sheet adhesiveness | Inflation test Test tem. (° C.) −40 | 100 |
|---|---|---|---|---|---|---|---|---|
| Exa 1 | U1 | 17 | 215 | 2.5 × 10⁴ | 90 | ◯ | ◯ | ◯ |
| Exa 2 | U2 | 37 | 213 | 2.4 × 10⁴ | 89 | ◯ | ◯ | ◯ |
| Exa 3 | U3 | 7 | 196 | 0.8 × 10⁴ | 91 | Δ | Δ | ◯ |
| Com Exa 1 | U4 | 0 | 198 | 0.7 × 10⁴ | 90 | X | X | Δ |
| Com Exa 2 | U5 | 4 | 195 | 0.6 × 10⁴ | 89 | X | Δ | Δ |
| Com Exa 3 | U6 | 44 | 217 | 2.9 × 10⁴ | 88 | ◯ | ◯ | X |

COMPARATIVE EXAMPLE 4

According to the following methods, Component I, Component II and Component III were prepared, respectively, and these components were mixed at a ratio of 100/7.5/4.3 in terms of weight ratio to obtain a coating material for an air bag comprising a silicone aqueous emulsion composition.

Component I (Silicone Aqueous Emulsion):

500 parts of octamethylcyclotetrasiloxane, 25 parts of methyltrimethoxysilane, 46.5 parts of water and 10 parts of dodecylbenzenesulphonic acid were emulsified by a homo-mixer, which were passed through a homogenizer two times under a pressure of 3,000 psi to obtain a stable emulsion. Thereafter, the emulsion was put into a flask and heated for 12 hours at a temperature of 70° C. Then, the heated emulsion was cooled to a room temperature, and left for 24 hours. Thereafter, a pH value of the obtained product was adjusted to 8.0 by using sodium carbonate.

A non-volatile portion of the obtained product was 47%, and a viscosity of a 20% toluene solution of organosiloxane separated by using methanol was 7,200 cp at 25° C.

Component II:

221 parts of 3-aminopropyltriethoxysilane was dropped, at a room temperature, into a mixture of 98 parts of maleic anhydride and 391 parts of ethanol, and agitated to obtain a reaction product.

Next, 30 parts of the above-obtained reaction product was gradually dropped, while being agitated at a room temperature, into 1,000 parts of colloidal silica (produced by Nissan Kagaku Co., Ltd., SNOWTEX 40, effective component: 40%, $Na_2O$ quantity: 0.6%, pH: 9.3) to obtain a semi-transparent homogeneous dispersing element. pH of the obtained product was 3.4.

Component III:

30 parts of dibutyltindilaurate, 1 parts of polyoxyethylenenonylphenyl ether and 69 parts of water were emulsified by the normal method.

A mixture of the above-obtained three components I, II and III was coated on one side of a plain woven fabric of 46 pieces/inch in warps and wefts having a nylon fineness of 420 d so that a thickness of the dried coating film becomes approximately 100 μm. It took a long time of 48 hours for the coating film to harden until a strength thereof became stable in an atmosphere of a relative humidity of 60% at a temperature of 20° C.

From the above results, the followings were made clear.

Since the thermoplastic polyurethane resins U4 and U5 obtained in Comparative Examples 1 and 2 had a high adhesiveness at the adhesive test, the resins broke the nylon surfaces. Further, they were damaged in an inflation test at a low temperature. Also, in Comparative Example 3, the resin was damaged when the air bag was developed at an inflation test at a high temperature. Thus, the resins U4, U5 and U6 are unfavorable as the base cloth.

Also, in Comparative Example 4, it took a long time until the coating liquid was hardened after it had been applied. Thus, the coating material obtained in Comparative Example 4 is unfavorable from its productivity and economical view point.

On the contrary, according to the present invention, since the adhesiveness or sticking property of the sheets was small and the sheets were not damaged in a wide range of a temperature of −40° C. to +100° C., the sheets according to the invention are optimum as an air bag material. Incidentally, although a sheet of the silicone modified thermoplastic polyurethane resin (U3) obtained in Example 3 had a minor damage at a temperature of −40° C., the sheet was not damaged at a temperature of −30° C. Thus, the sheet is sufficiently endurable for practical use as an air bag material.

As described above, according to a base cloth for an air bag and an air bag made of the base cloth of the present invention obtained by forming a coating film of a silicone modified thermoplastic polyurethane resin on a surface of a woven fabric, an air bag having a stable performance can be provided; since an organic solvent is not used in the resin, the workability is superior; the resin is safe for the human body; the air bag can be quickly developed in a wide range from an extremely low temperature to a high temperature; and there is no problem of adhesion.

While the invention has been explained with reference to the specific embodiments of the invention, the explanation is illustrative, and the invention is limited only by the appended claims.

What is claimed is:

1. An air bag comprising a base cloth formed of a woven fabric and a silicone modified thermoplastic polyurethane resin film containing a polysiloxane segment fitted on a surface of the woven fabric.

2. An air bag as claimed in claim 1, wherein said silicone modified thermoplastic polyurethane resin film contains a siloxane component of 5 to 40% by weight.

3. An air bag as claimed in claim 1, wherein said silicone modified thermoplastic polyurethane resin film is a reaction product of polyol, polyisocyanate, and polysiloxane, and said polysiloxane is an active hydrogen containing polysiloxane represented by a following general formula (1):

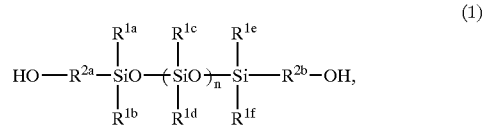

wherein, $R^{1a}$–$R^{1f}$ represent an alkyl group or aryl group of the same or different kinds having a carbon number of 1–8; $R^{2a}$ and $R^{2b}$ represent an alkylene group or di-substituted group having an ester bond or ether bond, of a same or different kinds; and n represents an integer of 5 to 200.

4. An air bag as claimed in claim 3, wherein said reaction product contains a chain extension agent.

5. A base cloth for an air bag comprising, a woven fabric, and a silicone modified thermoplastic polyurethane resin film having a polysiloxane segment formed on a surface of the woven fabric.

* * * * *